(12) United States Patent
Shatsky et al.

(10) Patent No.: US 12,299,303 B2
(45) Date of Patent: May 13, 2025

(54) DYNAMIC RESERVE CAPACITY IN STORAGE SYSTEMS

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/138,415

(22) Filed: Apr. 24, 2023

(65) Prior Publication Data

US 2024/0354015 A1    Oct. 24, 2024

(51) Int. Cl.
*G06F 3/06* (2006.01)

(52) U.S. Cl.
CPC ............ *G06F 3/064* (2013.01); *G06F 3/0608* (2013.01); *G06F 3/067* (2013.01)

(58) Field of Classification Search
CPC ......... G06F 3/064; G06F 3/0608; G06F 3/067
USPC ........................................................ 711/154
See application file for complete search history.

(56) References Cited

U.S. PATENT DOCUMENTS

| | | | |
|---|---|---|---|
| 5,381,539 A | 1/1995 | Yanai et al. | |
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 8,843,676 B2 | 9/2014 | Rajamanickam et al. | |
| 9,372,751 B2 | 6/2016 | McNutt | |
| 9,514,014 B2 | 12/2016 | Webman et al. | |
| 9,892,045 B1 | 2/2018 | Douglis et al. | |
| 10,078,598 B1 | 9/2018 | Wallace et al. | |
| 10,331,561 B1 | 6/2019 | Shilane et al. | |

(Continued)

FOREIGN PATENT DOCUMENTS

| | | |
|---|---|---|
| WO | 2015108670 A1 | 7/2015 |
| WO | 2020204880 A1 | 10/2020 |
| WO | 2020204882 A1 | 10/2020 |

OTHER PUBLICATIONS

International Search Report and Written Opinion of PCT/US2019/024885 dated Jan. 7, 2020, 13 pages.

(Continued)

*Primary Examiner* — Jared I Rutz
*Assistant Examiner* — Wei Ma
(74) *Attorney, Agent, or Firm* — Ryan, Mason & Lewis, LLP

(57) ABSTRACT

Techniques are provided for managing a dynamic reserve capacity of a block storage system. A storage control system partitions a storage capacity of at least one storage device into a plurality of blocks for storing data. A data access operation is performed by the storage control system which results in invalidating at least a portion of data stored in a given block. In response to the invalidating, the storage control system determines a degree of invalid data in the given block, and compares the determined degree of invalid data to a utilization threshold. The storage control system designates the given block as fully utilized in response to determining that the degree of invalid data does not exceed the utilization threshold, and designates a capacity of the given block that is occupied by the invalid data to be part of a reserve capacity of the at least one storage device.

20 Claims, 4 Drawing Sheets

(56) References Cited

U.S. PATENT DOCUMENTS

| | | | |
|---|---|---|---|
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 11,221,975 | B2 | 1/2022 | Puder et al. |
| 11,262,933 | B2 | 3/2022 | Matosevich et al. |
| 11,301,162 | B2 | 4/2022 | Matosevich et al. |
| 11,307,935 | B2 | 4/2022 | Keller et al. |
| 11,372,810 | B2 | 6/2022 | Keller et al. |
| 11,416,396 | B2 | 8/2022 | Shatsky et al. |
| 11,418,589 | B1 | 8/2022 | Spiegelman |
| 11,487,432 | B2 | 11/2022 | Aharoni et al. |
| 11,487,460 | B2 | 11/2022 | Keller et al. |
| 11,513,997 | B2 | 11/2022 | Keller et al. |
| 11,550,479 | B1 | 1/2023 | Shatsky et al. |
| 11,573,736 | B2 | 2/2023 | Matosevich et al. |
| 11,606,429 | B2 | 3/2023 | Aharoni et al. |
| 11,609,854 | B1 | 3/2023 | Shatsky et al. |
| 11,630,773 | B1 | 4/2023 | Shatsky et al. |
| 11,636,089 | B2 | 4/2023 | Aharoni et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2015/0113223 | A1* | 4/2015 | Brown ............... G06F 12/0893 711/133 |
| 2016/0092120 | A1* | 3/2016 | Liu ..................... G06F 3/0629 711/103 |
| 2016/0103617 | A1* | 4/2016 | Kang ................. G06F 12/0246 711/103 |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2019/0278498 | A1* | 9/2019 | Dedrick ............... G06F 3/0653 |
| 2020/0097403 | A1* | 3/2020 | Saxena ............... G06F 12/0246 |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |
| 2022/0004320 | A1 | 1/2022 | Matosevich et al. |
| 2022/0035788 | A1 | 2/2022 | Aharoni et al. |
| 2022/0113867 | A1 | 4/2022 | Aharoni et al. |
| 2022/0114184 | A1 | 4/2022 | Sharma et al. |
| 2022/0116454 | A1 | 4/2022 | Aharoni et al. |
| 2022/0121458 | A1 | 4/2022 | Moran et al. |
| 2022/0129380 | A1 | 4/2022 | Shatsky et al. |
| 2022/0171567 | A1 | 6/2022 | Matosevich et al. |
| 2022/0187991 | A1 | 6/2022 | Keller et al. |
| 2022/0222113 | A1 | 7/2022 | Shatsky et al. |
| 2022/0342758 | A1 | 10/2022 | Tal et al. |
| 2022/0350497 | A1 | 11/2022 | Matosevich et al. |
| 2022/0358018 | A1 | 11/2022 | Bar Shalom et al. |
| 2022/0405254 | A1 | 12/2022 | Shatsky et al. |
| 2022/0414102 | A1 | 12/2022 | Shatsky et al. |

OTHER PUBLICATIONS

International Search Report and Written Opinion of PCT/US2019/024900 dated Jan. 7, 2020, 12 pages.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," IEEE Symposium on High-Performance Computer Architecture, Feb. 11-15, 2006, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting to Know Dell EMC PowerFlex," Version 3.5.x, Rev. 02, Jan. 2021, 66 pages.

Dell EMC, "Dell EMC VxRack FLEX," Dell EMC Product Overview, Apr. 2018, 5 pages.

G. Soundararajan et al., "Dynamic Resource Allocation for Database Servers Running on Virtual Storage," FAST 2009: Proceedings of the 7th conference on File and storage technologies, Feb. 2009, pp. 71-84.

U.S. Appl. No. 17/583,365 filed in the name of Doron Tal et al. on Jan. 25, 2022, and entitled "Data Deduplication in a Storage System.".

U.S. Appl. No. 17/583,787 filed in the name of Michal Yarimi et al. on Jan. 25, 2022, and entitled "Intelligent Defragmentation in a Storage System.".

U.S. Appl. No. 17/681,449 filed in the name of Yosef Shatsky et al. on Feb. 25, 2022, and entitled "Optimization for Garbage Collection in a Storage System.".

U.S. Appl. No. 17/714,362 filed in the name of Doron Tal et al. on Apr. 6, 2022, and entitled "Optimization for Direct Write to Raid Stripes.".

U.S. Appl. No. 17/726,853 filed in the name of Irit Brener-Shalem et al. on Apr. 22, 2022, and entitled "Intelligent Load Scheduling in a Storage System.".

U.S. Appl. No. 17/729,219 filed in the name of Yosef Shatsky et al. on Apr. 26, 2022, and entitled "Load Distribution in a Data Storage System.".

U.S. Appl. No. 17/853,364 filed in the name of Yosef Shatsky et al. on Jun. 29, 2022, and entitled "Managing Lookup Operations of a Metadata Structure for a Storage System.".

U.S. Appl. No. 17/864,579 filed in the name of Yosef Shatsky et al. on Jul. 14, 2022, and entitled "Managing Granularity of a Metadata Structure for a Storage System.".

U.S. Appl. No. 17/868,045 filed in the name of Yosef Shatsky et al. on Jul. 19, 2022, and entitled "Managing Insert Operations of a Metadata Structure for a Storage System.".

U.S. Appl. No. 17/969,875 filed in the name of Yosef Shatsky et al. on Oct. 20, 2022, and entitled "Multiple-Instance Write Cache for a Storage System.".

(56) References Cited

OTHER PUBLICATIONS

U.S. Appl. No. 18/090,792 filed in the name of Christopher Trudel et al. on Dec. 29, 2022, and entitled "Cluster Management in Large-Scale Storage Systems.".
U.S. Appl. No. 18/092,516 filed in the name of Igal Moshkovich et al. on Jan. 3, 2023, and entitled "Managing Data on Shutdown of Storage System.".
U.S. Appl. No. 17/511,695 filed in the name of Yosef Shatsky et al. on Oct. 27, 2021, and entitled "Write Cache Management.".

* cited by examiner

300

400

DYNAMIC RESERVE CAPACITY IN STORAGE SYSTEMS

TECHNICAL FIELD

This disclosure relates generally to data storage systems and, more particularly, to techniques for managing reserved storage capacity in storage systems such as log-structured storage systems.

BACKGROUND

State-of-the-art data storage systems are designed with the goal of enhancing storage efficiency and performance. For example, block storage systems such as flash-based solid-state drives (SSDs) can implement a log-structured storage architecture for high performance. In a log-structured architecture, the physical storage capacity is divided into a contiguous array of equal-sized "segments" (or log segments). The log-structured storage system manages data in an append-only manner, where new data blocks and modified/updated data blocks are written into free segments at the end of the log-structured array. Over time, data blocks in a given segment can become invalid as a result of the data blocks being either deleted or overwritten by updated/modified data blocks that are written "out-of-place" to free segments of the append-only log-structured array, which creates "holes" of invalid data blocks in source log segments.

As invalid data blocks in log segments are generated over time, a garbage collection process can be performed to defragment the storage space of the log-structured array and close the "holes" of invalid data blocks in the log segments. For example, storage capacity can be reclaimed from source segments by running a garbage collection process that is configured to move remaining valid data blocks from source segments to new segments, and then free the source segments for subsequent use. The garbage collection process is a performance overhead because the defragmentation cycles of log segments cause an increase in input/output (I/O) amplification (e.g., read amplification and write amplification) in a way that can adversely impact storage performance, as it requires additional read and write operations not requested by users. In addition, garbage collection operations lead to increased write application as a result of frequent rewriting of valid data blocks which, in turn, leads to decreased endurance of solid-state storage media (e.g., flash-based SSDs).

To increase the performance and endurance of solid-state storage media, a certain amount of the total capacity of a solid-state storage device can be allocated as "over-provisioned capacity" or "reserve capacity" which is not accessible to users or host systems, but which can only be accessed by a storage controller as additional storage capacity to perform various memory management functions (e.g., garbage collection, wear-leveling, data protection, etc.). Typically, the manufacture of a solid-state storage device (e.g., SSD drive) will allocate a portion of the total storage capacity as reserve capacity during factory configuration and firmware programming, wherein the percentage of reserve capacity is selected based on various factors such as, e.g., the total capacity of the solid-state storage device, the type of application for which the solid-state storage device will be utilized (e.g., read-intensive applications or write-intensive applications). However, during real-time use of the solid-state storage device, the actual read/write workload may be different than the anticipated read/write workload such that the fixed amount of reserve capacity it not optimal for the actual read/write workload.

SUMMARY

Exemplary embodiments of the disclosure include techniques for managing a dynamic reserve capacity of a block storage system such as a log-structured storage system. For example, an exemplary embodiment includes a method that is implemented by a storage control system. The storage control system partitions a storage capacity of at least one storage device into a plurality of blocks for storing data. A data access operation is performed by the storage control system which results in invalidating at least a portion of data stored in a given block of the plurality of blocks. In response to invalidating the portion of data stored in the given block, the storage control system determines a degree of invalid data in the given block, and compares the determined degree of invalid data in the given block to a utilization threshold. The storage control system designates the given block as fully utilized in response to determining that the degree of invalid data does not exceed the utilization threshold, and designates a capacity of the given block which is occupied by the invalid data to be part of a reserve capacity of the at least one storage device.

Other embodiments will be described in the following detailed description of exemplary embodiments, which is to be read in conjunction with the accompanying figures.

DETAILED DESCRIPTION

Figure 1:
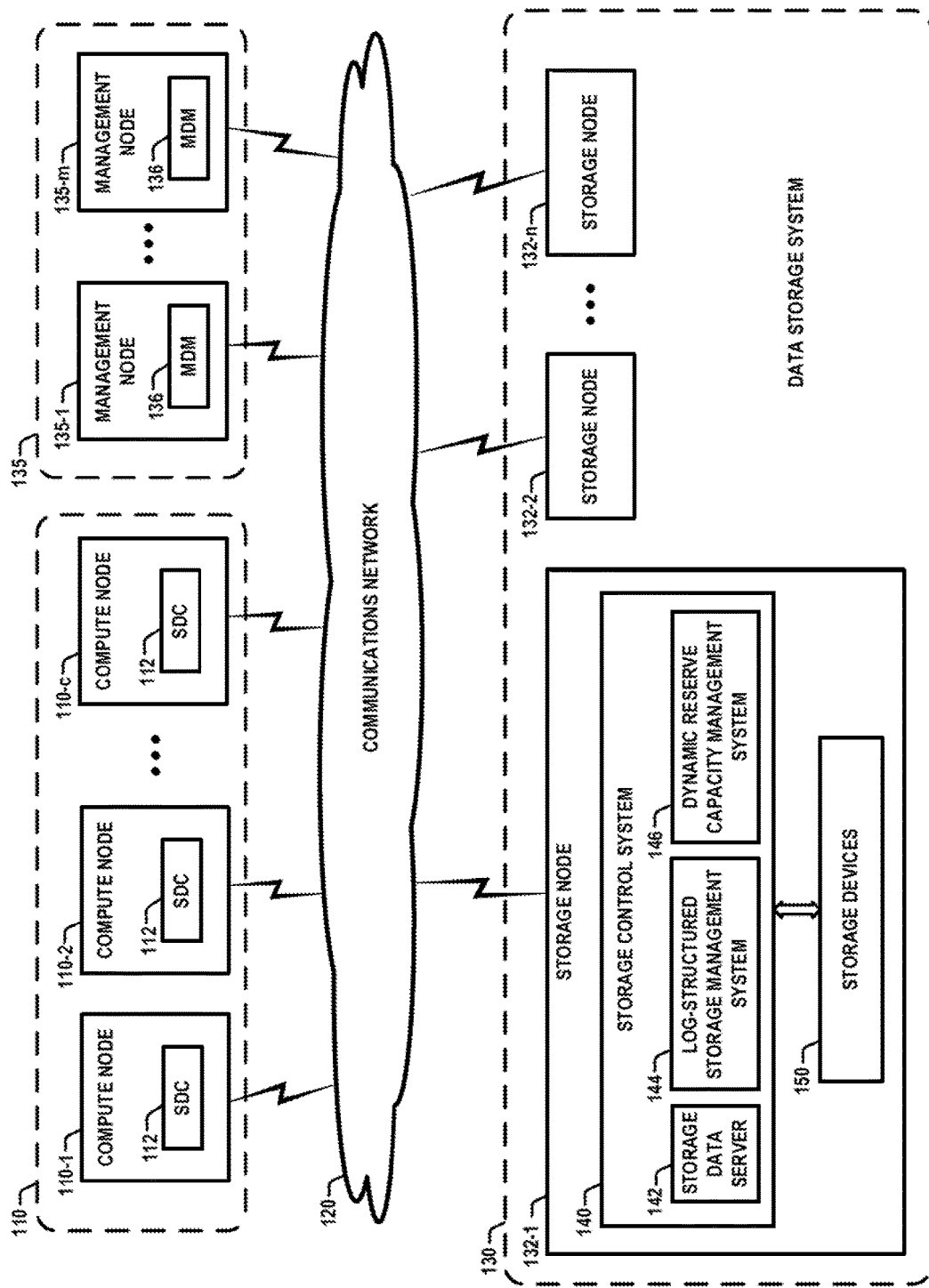
FIG. 1 schematically illustrates a network computing environment comprising a data storage system which is configured to manage a dynamic reserve capacity, according to an exemplary embodiment of the disclosure.

Exemplary embodiments of the disclosure will now be described in further detail with regard to techniques for managing a dynamic reserve capacity of a block storage system such as a log-structured storage system. As noted above, in a log-structured storage system, the physical storage capacity is divided into a contiguous array of "segments" (e.g., equal-sized blocks) and data is managed in an append-only manner, wherein new data blocks and modified/updated data blocks are written into free segments at the end of the log-structured array. Since the log-structured storage system writes updated/modified data blocks to the append-only log without modifying existing data blocks in-place, a garbage collection process can be regularly performed to reclaim the storage space occupied by invalid data blocks in log segments.

The garbage collection process, however, adds to performance overhead of a storage system. For example, as noted above, the garbage collection process requires additional data I/O read and write operations that are not requested by a user and, thus, increases the I/O pressure on the log-structured storage system. Furthermore, the garbage collection process can increase write amplification due to, e.g., the rewriting of valid data of partially valid data blocks. In general, a write amplification factor (WAF) is defined as:

$$WAF = \frac{\text{Amount of Physical Writes}}{\text{Amount of Host Writes}},$$

where the "amount of host writes" denotes the amount of data that is sent from users/hosts to the storage control system in connection with I/O write requests, and the "amount of physical writes" denotes the amount of data that is actually written to the solid-state storage device by the storage control system as a result of executing the user/host I/O write requests and performing associated management functions (e.g., garbage collection operations). It is desirable to maintain the WAF as low as possible (e.g., close to 1.0).

The process of garbage collection can become more expensive as the amount of used capacity of the log-structured storage system increases. For example, assume that the total capacity of a given log-structured storage system is 90% full of valid data, and that the new writes invalidate existing log segments uniformly. In this instance, all log segments in the storage system would be 90% full of valid data. To reclaim the storage space of a single segment, 90% of 10 segments would need to be rewritten to another segment leading to an overhead of 9:1 of garbage collection data to user data. This leads to significantly reduced system performance.

Various techniques can be implemented to minimize the performance overhead associated with garbage collection in a log-structured storage system. For example, in some storage systems, garbage collection is implemented but no reserve is implemented. With this approach, assuming the workload results in uniform invalidation, a disadvantage is that the storage performance only degrades as the system capacity becomes filled with data and, performance-wise, the storage system becomes unusable before the capacity reaches 100% utilization. On the other hand, an advantage of this approach is that 100% of the storage system capacity is utilized. It is to be noted, however, that this approach relies on the common case that users typically will not want their storage systems to reach such a high-capacity utilization anyway, because they are then at risk of the storage system running out of capacity and going offline and, consequently, the users will scale-out the storage systems by adding additional storage capacity. In addition, uniform invalidation is not a common real-life workload, so the overhead/cost of garbage collection would be less, even for full storage systems.

Moreover, as noted above, another technique that can be implemented to minimize the performance overhead associated with garbage collection in a log-structured storage system comprises allocating a certain amount of the total capacity of the storage system as "over-provisioned capacity" or "reserve capacity" which can only be accessed by the storage controller (and not accessed by the host systems). For example, when 20% of the total capacity is allocated as "reserve capacity" and 80% of the total capacity is accessible to users/hosts for storing data, the utilization of segments is capped at 4:1.

An advantage of utilizing reserve capacity is that the performance of the storage system remains reasonable even when the user capacity is fully utilized (e.g., near 100% utilization). A disadvantage of utilizing reserve capacity is that there is less storage capacity for the user, which potentially makes the storage more expensive per unit of storage sold. Another disadvantage of utilizing a fixed allocation of reserve capacity is that the amount of reserved capacity may not be optimal for the actual read/write workload.

For example, as noted above, the manufacture of a solid-state storage device (e.g., SSD drive) will typically reserve a portion of the total storage capacity as over-provisioned capacity during factory configuration and firmware programming. The factory over-provisioned capacity set by the manufacturer for a given solid-state storage device will vary in size depending on various factors such as, e.g., the total capacity of the solid-state storage device, the type of application for which the solid-state storage device will be utilized (e.g., read-intensive applications or write-intensive applications). A read-intensive application is one in which typical client workloads are dominated by reads (e.g., 20% writes and 80% reads), while a write-intensive application is one in which typical client workloads are dominated by writes (e.g., 20% reads and 80% writes). For example, an enterprise application using a solid-state storage device for read caching can be considered a read-intensive application, while a database application can be considered a write-intensive application.

While a factory-configured reserve capacity for a solid-state storage device may be sufficient for an anticipated write workload, the fixed over-overprovisioning capacity configuration may not be sufficient for the actual write workload during real-time use of the solid-state storage device, wherein the actual write workload is greater than the anticipated write workload, resulting in additional wear and reducing the lifespan of the solid-state storage device. On the other hand, if the factory-configured reserve capacity for a solid-state storage device is set to a relatively high percentage for an anticipated write workload, such large amount of reserve capacity may be overkill and unnecessary in circumstance wherein the actual workload is more read intensive than anticipated.

Exemplary embodiments of the disclosure provide techniques for implementing and managing a "dynamic reserve capacity" to manage free space in, e.g., a log-structured storage systems, while avoiding unusable performance when the storage system is near full user capacity, and while minimizing reserve capacity overhead. Exemplary embodiments of the disclosure combine the above-noted advantages associated with (i) implementing no reserve at all and (ii) utilizing reserve capacity for internal use by a storage controller, wherein instead of having a fixed-sized, pre-allocated, log-structured storage reserve, exemplary techniques as disclosed herein implement a dynamic reserve capacity management process to, e.g., reserve capacity for the scenario of uniform invalidation (random user writes), wherein the amount of reserve capacity can automatically and gradually change based on, e.g., an amount and size of areas of data that are uniformly invalidated, and changes in I/O read and write workload.

More specifically, exemplary embodiments of the disclosure include techniques for implementing and managing a dynamic reserve capacity, wherein the dynamic reserve capacity comprises relatively small invalid portions of log segments. In other words, the proposed solution utilizes a type of LSA reserve per log segment (or more generally, block), but only if a small portion of the segment is invalidated. For example, when a given log segment is first written, it is written in full. As the data of the given log segment is invalidated, the amount of free space of the given log segment depends on the degree of invalidation. When the degree of invalidation is low, the cost of garbage collection would be high, and therefore, the utilization of the given log segment is deemed to be at 100% utilization, despite having some free capacity by virtue of the invalid data. The invalidated capacity of the given log segment is considered as used, which provides a form of LSA reserve because this prevents garbage collection from running on nearly full log segments. From the user's perspective, this means that physical space has not been reclaimed. Because the degree of invalidation is low, the reserve capacity overhead is low as well. As more capacity in the given log segment is invalidated, all invalidated capacity of the given log segment becomes free, and garbage collection of the given segment is permitted. This is applied per log segment giving the advantage that log segments which are heavily invalidated at once reflect their free capacity immediately.

For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

FIG. 1 schematically illustrates a network computing environment comprising a data storage system which is configured to manage a dynamic reserve capacity, according to an exemplary embodiment of the disclosure. In particular, FIG. 1 schematically illustrates a network computing environment 100 which comprises one or more compute nodes 110-1, 110-2, . . . 110-c (collectively, compute nodes 110), a communications network 120, a data storage system 130 comprising a cluster of storage nodes 132-1, 132-2, . . . , 132-n (collectively, storage nodes 132), and a cluster of management nodes 135 comprising a plurality of management nodes 135-1, . . . , 135-m (alternatively, management nodes 135). In some embodiments, each compute node 110-1, 110-2, . . . 110-c comprises a storage data client (SDC) 112. In addition, each management node 135-1, . . . , 135-m comprises a respective metadata manager (MDM) 136. As further shown in FIG. 1, the storage node 132-1 comprises a storage control system 140, and storage devices 150. In some embodiments, the storage control system 140 is a software-defined storage control system which comprises a storage data server (SDS) 142, a log-structured storage management system 144, and a dynamic reserve capacity management system 146, the functions of which will be explained below. In some embodiments, the other storage nodes 132-2 . . . 132-n have the same or similar configuration as the storage node 132-1 shown in FIG. 1.

The compute nodes 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the compute nodes 110 comprise application servers, database servers, etc. The compute nodes 110 can include virtual nodes such as virtual machines and container systems. In some embodiments, the compute nodes 110 comprise a cluster of compute nodes of an enterprise computing system, a cloud-based computing system, or other types of computing systems or information processing systems comprising multiple compute nodes associated with respective users. The compute nodes 110 issue data access requests (e.g., I/O write requests, and I/O read requests).

The communications network 120 is configured to enable communication between the compute nodes 110 and the storage nodes 132, and between the management nodes 135, the compute nodes 110, and the storage nodes 132, as well as to enable peer-to-peer communication between the storage nodes 132. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), RDMA over Converged Ethernet (RoCE), Internet Small Computer System Interface (iSCSI), Peripheral Component Interconnect express (PCIe), Infini-Band, Gigabit Ethernet, etc., to implement I/O channels and support storage network connectivity. Numerous alternative networking arrangements are possible in a given embodiment, as will be appreciated by those skilled in the art.

In some embodiments, each storage node 132 comprises a server node (e.g., storage-only node) that is implemented on, e.g., a physical server machine or storage appliance comprising hardware processors, system memory, and other hardware resources that execute software and firmware to implement the functionality of the storage node 132 and the associated storage control system 140. In some embodiments, each storage node 132 comprises a plurality of control processors which execute a lightweight operating system (e.g., a customized lightweight Linux kernel) and functional software (e.g., software-defined storage software) to implement functions of the storage control system 140, as discussed in further detail below.

The storage devices 150 of a given storage node 132 can be internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 150 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 150 may be implemented on each storage node 132. In this regard, the term "storage device" as used herein should be broadly construed to encompass all types of persistent storage media including hybrid drives. On a given storage node 132, the storage control system 140 is configured to communicate with the storage devices 150 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

The data storage system 130 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out storage system which allows additional storage nodes to be added (or removed) to the cluster to scale the performance and storage capacity of the data storage system 130. It is to be noted that each storage node 132 and associated storage devices 150 is an example of what is more generally referred to herein as a "storage system."

In some embodiments, the data storage system 130 comprises a dynamic scale-out software-defined storage system which is configured to implement a high-capacity block-level SAN storage system (e.g., virtual SAN system) that consolidates the capacity of the local storage devices 150 (e.g., HDDs, SSDs, NVMe flash storage, flash PCIe cards etc.) of the storage nodes 132 into shared block storage which is logically partitioned into logical storage volumes identified by, e.g., logical unit numbers (LUNs). In an exemplary embodiment of a scale-out software-defined SAN storage system, the storage control systems 140 comprise software components of a software-defined storage system, which are executed on the storage nodes 132 to implement a software-defined storage environment in which the storage nodes 132 form a loosely coupled storage server cluster and collectively communicate and operate to create a server-based SAN system (e.g., virtual SAN) to provide host access to a virtual pool of block storage using the combined storage capacity (e.g., storage devices 150) of the storage nodes 132.

In some embodiments, the SDC 112 components, the MDM 136 components, and the SDS 142 components of the storage control systems 140 comprise software components of a software-defined storage platform, wherein the software components are installed on physical server machines (or server nodes) such as application servers, storage servers, control servers, etc. In some embodiments, virtual machines (e.g., Linux-based virtual machines) are utilized to host the software components of the software-defined storage platform. The software components collectively implement various functions for deploying and managing a software-defined, scale-out server SAN architecture which can grow from a few servers to thousands of severs.

For example, the SDS 142 comprises a service that is configured to manage the storage capacity (e.g., storage devices 150) of a single server (e.g., storage node 132) and provide back-end access to the storage devices of the server. In other words, the SDS 142 service is installed on each server that contributes some or all of the capacity of its local storage devices to the scale-out data storage system. More specifically, in a scale-out software-define storage environment, the SDS 142 components of the storage control systems 140 are configured to create and manage storage pools (e.g., virtual pools of block storage) by aggregating storage capacity of the respective storage devices 150 and dividing each storage pool into one or more volumes, wherein the volumes are exposed to the SDC 112 components of the compute nodes 110 as virtual block devices. For example, a virtual block device can correspond to a volume of a storage pool. Each virtual block device comprises any number of actual physical storage devices, wherein each virtual block device is preferably homogenous in terms of the type of storage devices that make up the block device (e.g., a block device can include only HDD devices or SSD devices, etc.). In this regard, each instance of the SDS 142 that runs on a respective one of the storage nodes 132 contributes some or all of its local storage space to an aggregated virtual pool of block storage with varying performance tiers (e.g., HDD, SSD, etc.) within a virtual SAN.

In some embodiments, each SDC 112 that executes on a given compute node 110 comprises a lightweight block device driver that is deployed to expose shared block volumes to the compute nodes 110. In particular, each SDC 112 is configured to expose the storage volumes as block devices to the applications located on the same server (e.g., application server) on which the SDC 112 is installed. In other words, as shown in FIG. 1, the SDCs 112 run on the same server machines as the compute nodes 110 which require access to the block devices exposed and managed by the SDSs 142 of the storage nodes 132. The SDC 112 of a given compute node 110 exposes block devices representing the virtual storage volumes that are currently mapped to the given compute node 110. In particular, the SDC 112 for a given compute node 110 serves as a block driver for the compute node 110, wherein the SDC 112 intercepts I/O requests, and utilizes the intercepted I/O request to access the block storage that is managed by the SDSs 142. The SDCs 112 are installed in the operating system or hypervisor hosting the application layer, and provides the operating system or hypervisor (which runs the SDC 112) access to the logical block devices (e.g., volumes). The SDCs 112 have knowledge of which SDSs 142 hold its block data, so multipathing can be accomplished natively through the SDCs 112, where the communications network 120 is configured to provide an any-to-any connection between the compute nodes 110 and the storage nodes 132. More specifically, each SDC 112 connects to every SDS 142, which eliminates the need for multipath software.

In some embodiments, the management nodes 135-1, . . . , **135-*m* comprise servers (e.g., control servers) that host and run respective instances of the MDM 136 component to implement a management layer which manages and configures the software-defined storage system in the network computing environment 100. The MDM 136 is a service that functions as a monitoring and configuration agent of the storage environment. More specifically, in some embodiments, the management nodes 135-1, . . . , 135-***m* collectively host a tightly-coupled cluster of MDMs 136, which is configured to supervise the operations of the storage cluster and manage storage cluster configurations. For example, the cluster of MDMs 136 (or MDM cluster) manage the storage system by aggregating the entire storage exposed to the MDM cluster by the SDSs 142 to generate a virtual storage layer (e.g., virtual SAN storage layer), wherein logical volumes can be defined over storage pools and exposed to host applications as a local storage device using the SDCs 112.

Further, the cluster of MDMs 136 is configured to manage various types of metadata associated with the software-defined storage system. For example, such metadata includes a mapping of the SDCs 112 to the SDSs 142 of the storage nodes 132, wherein such mapping information is provided to the SDCs 112 and the SDSs 142 to allow such components to control input/output (I/O) data path operations (e.g., allow the SDCs 112 to communicate with target SDSs 142 to access data in logical volumes that are mapped to the SDCs 112), while the cluster of MDMs 136 operate outside of the data path such that no I/O operations run through the MDMs 136. In addition, the cluster of MDMs 136 collects connectivity status updates from the SDCs 112 to monitor all connections between SDCs 112 and the SDSs 142 to determine the current system state, and posts events whenever a given SDC 112 connects to or disconnects from a specific IP address of a given SDS 142.

In addition, the cluster of MDMs 136 is configured to manage various management operations such as data migration, rebuilds, and other system-related functions. In this regard, the cluster of MDMs 136 generate and manage various types of metadata that are required to perform various management operations in the storage environment such as, e.g., performing data migration operations, performing rebalancing operations, managing configuration changes, managing the SDCs 112 and the SDSs 142, maintaining and updating device mappings, maintaining management metadata for controlling data protection operations such as snapshots, replication, RAID configurations, etc., managing system capacity including storage device allocations and/or release of capacity, performing operations for recovery from errors and failures, and system rebuild tasks, etc. The cluster of MDMs 136 communicates with the SDCs 112 to provide notification of changes in data layout, and communicate with the SDSs 142 to coordinate rebalancing operations.

FIG. 1 shows an exemplary embodiment of a two-layer deployment in which the SDCs 112 (which consume storage) are deployed separately from the SDSs 142 (which contribute storage), e.g., the SDCs 112 are deployed on compute-only server nodes which host end-user applications, while the SDSs 142 are deployed on storage-only server nodes which contribute storage to the virtual SAN storage system. Moreover, while FIG. 1 shows an exemplary embodiment in which the MDMs 136 (which manage storage blocks and track data locations across the storage system) are separately deployed on management nodes 135, in some embodiments, the MDMs 136 can be deployed with the SDSs 142 on some of the storage nodes 132 (e.g., each metadata manager 136 can be deployed on a separate one of the storage-only server nodes).

In other embodiments, a converged infrastructure (e.g., hyperconverged infrastructure) can be implemented to provide a single-layer deployment in which, e.g., the SDCs 112 and the SDSs 142 are deployed on the same servers (each server node deploys a SDC 112 and an SDS 142) such that each server node is a data storage consumer (compute node) and a data storage supplier (storage provider node). In addition, for a single-layer deployment, the metadata managers 136 can be deployed on different server nodes which also host the SDCs 112 and SDSs 142. In other embodiments, the system of FIG. 1 can be a hybrid system that is implemented with a combination of a single-layer and two-layer deployment.

The log-structured storage management system 144 is configured to configure and manage one or more log-structured arrays within block storage capacity (e.g., volumes) of the storage devices 150. The dynamic reserve capacity management system 146 is configured to monitor the utilization of segments/blocks of the one or more log-structured arrays and manage a dynamic reserve capacity for the storage devices 150 of the given storage node 132, wherein the amount of reserve capacity is based on, e.g., amount of invalidated capacity of log segments/blocks which are determined, at a given time, to have a relatively low degree of invalid data. In some embodiments, the log-structured storage management system 144 and the dynamic reserve capacity management system 146 perform functions as will now be explained in detail in conjunction with the exemplary embodiment shown in FIG. 2.

Figure 2:
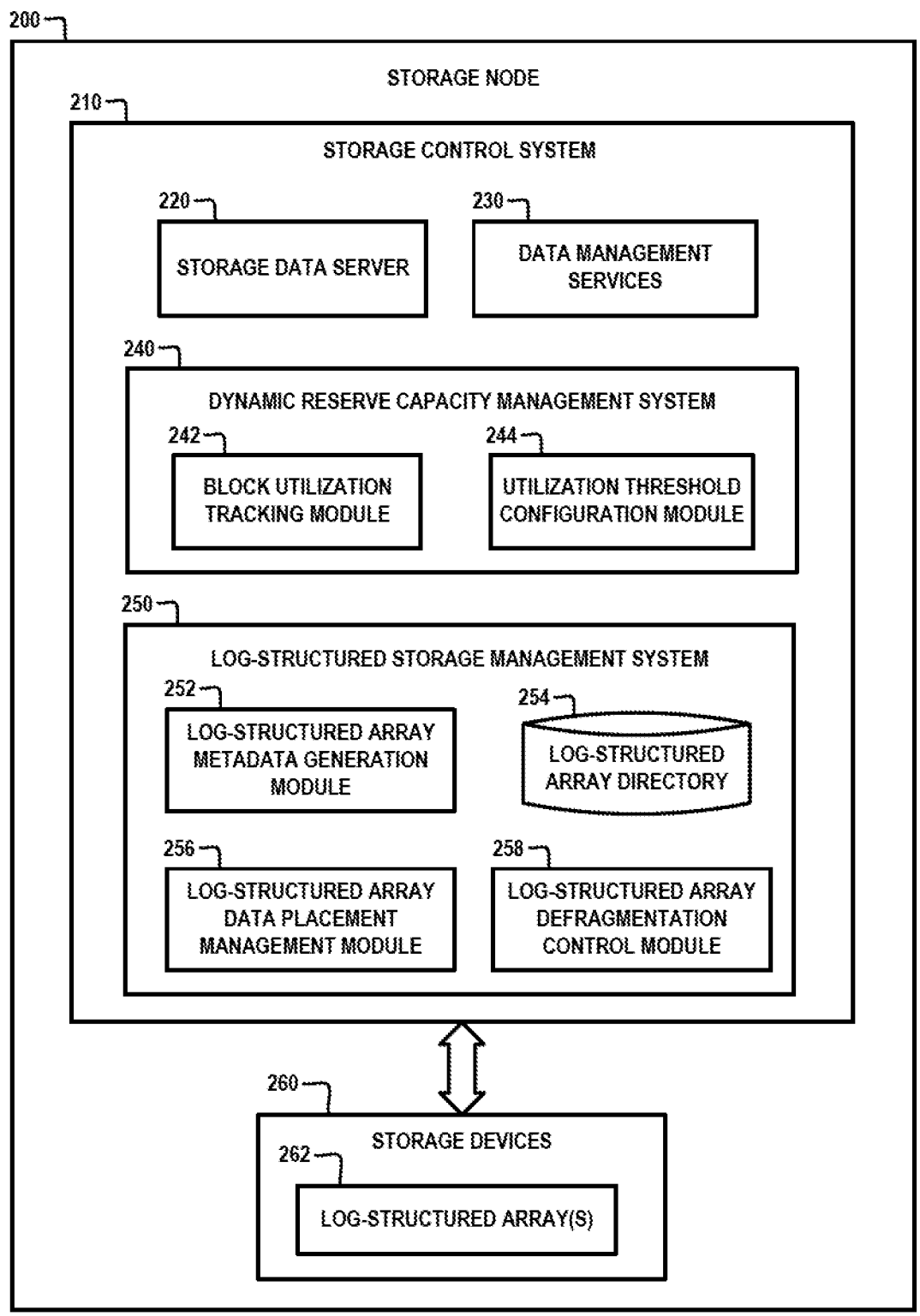
FIG. 2 schematically illustrates a storage node which comprises a storage control system that is configured to manage a dynamic reserve capacity, according to an exemplary embodiment of the disclosure.

FIG. 2 schematically illustrates a storage node 200 which comprises a storage control system that is configured to manage a dynamic reserve capacity, according to an exemplary embodiment of the disclosure. In some embodiments, FIG. 2 schematically illustrates an exemplary architecture for the storage nodes 132 of the data storage system 130 of FIG. 1. As shown in FIG. 2, the storage node 200 comprises a storage control system 210, wherein the storage control system 210 comprises a storage data server 220, data management services 230, a dynamic reserve capacity management system 240, and a log-structured storage management system 250. The dynamic reserve capacity management system 240 comprises a block utilization tracking module 242, and a utilization threshold configuration module 244. The log-structured storage management system 250 comprises a log-structured array metadata generation module 252, a log-structured array directory 254, a log-structured array data placement management module 256, and a log-structured array defragmentation control module 258. The storage node 200 further comprises a plurality of storage devices 260. The storage control system 210 is configured to manage and control access to the storage devices 260.

The storage data server 220 implements storage virtualization and management functions as discussed above including, but not limited to, aggregating the storage capacity of the storage devices 260 into storage pools, configuring one or storage volumes from the aggregated storage capacity, which are exposed as block devices (e.g., LUNs) to applications or host systems that consume the data, etc. In some embodiments, the data management services 230 include one or more types of data management services including, but not limited to, inline data compression/decompression, deduplication, thin provisioning, and data protection functions such as data replication, backup, snapshots, and data protection and resiliency schemes based on data striping and/or parity (e.g., erasure coding, RAID, etc.), and other types of data management functions, depending on the system configuration.

Figure 3:
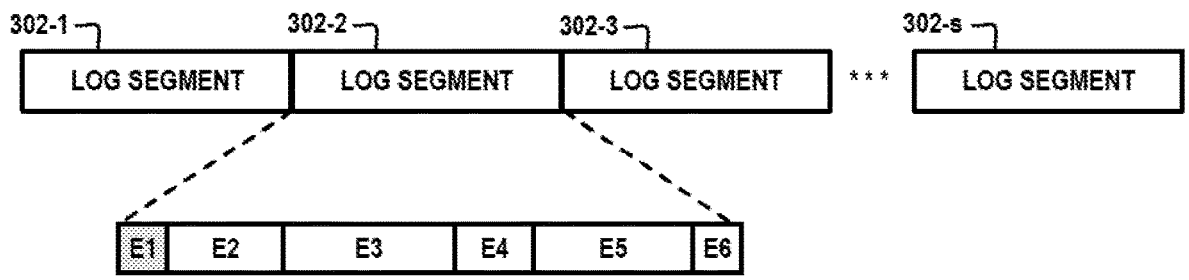
FIG. 3 schematically illustrates a log-structured array which can be generated and managed by a storage system, according to an exemplary embodiment of the disclosure.

In some embodiments, the log-structured storage management system 250 is configured to create and manage one or more log-structured array(s) 262 within block storage capacity (e.g., volumes) of the storage devices 260. More specifically, the log-structured storage management system 250 is configured to organize portions of the block storage capacity of one or more of the storage pools/volumes of the storage devices into a log-structured array architecture in which data is stored (in compressed form and/or non-compressed form) in log segments of log-structured arrays according to a data placement scheme. For example, FIG. 3 schematically illustrates a log-structured array which can be generated and managed by a storage system, according to an exemplary embodiment of the disclosure. For example, FIG. 3 schematically illustrates a log-structured array 300 which can be generated and managed by the storage control system 210 of FIG. 2, according to an exemplary embodiment of the disclosure.

The log-structured array 300 comprises an array of log segments 302-1, 302-2, 302-3, . . . , 302-s (or more generally, blocks 302-1, 302-2, 302-3, . . . , 302-s). In some embodiments, the log-structured array 300 is allocated from block storage capacity of storage devices. As is known in the art, the block storage capacity of a storage device is divided into a plurality of "logical blocks" (e.g., fixed-size allocation units), wherein each "logical block" comprises a separately addressable unit of the physical storage space with a specified block size (e.g., allocation unit size). Each logical block (e.g., allocation unit) comprises a same number of one or more physical data blocks of the underlying storage media.

Each log segment 302-1, 302-2, 302-3, . . . , 302-s of the log-structured array 300 comprises a set of contiguous "logical blocks" of the physical block storage space. In some embodiments, the log segments 302-1, 302-2, 302-3, . . . , 302-s are equal in size (e.g., the log segments 302-1, 302-2, 302-3, . . . , 302-s each include the same number of logical blocks). For example, assuming that each logical block of a given storage device (e.g., cluster of sectors on HDD, or pages of an SSD) is 4 KB, and that each log segment 302-1, 302-2, 302-3, . . . , 302-s has a segment size of 512 KB, then each of the log segments 302-1, 302-2, 302-3, . . . , 302-s comprises a consecutive sequence of 128 logical blocks within the storage space. In other words, each log segment contains a same number of fixed-size blocks, where each block is identified by a logical block address (LBA) and has a size (e.g., 4 KB) that aligns with the underlying disk drives.

More specifically, as is known in the art, the storage space of a storage device is organized into fixed-size addressable storage units (referred to as allocation units). The "allocation unit size" or "cluster size" of a given storage device is defined by the file system or operating system kernel when formatting the given storage device. An allocation unit represents the smallest logical block size of storage space that can be used to hold data and which is addressed as one logical unit by the operating system. Each logical block has the same "allocation unit size" which corresponds to a specific number of bytes of physical disk space. For example, for SSD devices, the smallest addressable storage unit is a "page" wherein common page sizes include, for example, 2 KB, 4 KB, 8 KB, 16 KB, etc. The pages of an SSD device are aggregated into blocks, e.g., 128, 256, or 512 pages per block. For HDD devices, the smallest addressable storage unit is a logical data block which is uniquely addressed using a corresponding logical block address (LBA). In HDD devices, a logical block size (e.g., 4 KB) can be equal to the physical sector size, or the logical block size can be a multiple of the physical sector size such that each logical block corresponds to a block of physical sectors. For example, for a physical sector size of 512 bytes, a logical block size can be 8×512 bytes=4096 bytes (or 4 KB).

When data is written to the log-structured array 300, the data is written to a free log segment at the end of the log-structured array 300. In addition, metadata comprising log indexing information and other types of metadata are also appended to the log segment when data is written to the segment. In this regard, each log segment with data will include a sequence of appended log entries comprising data items and metadata items. For example, as schematically illustrated in FIG. 3, the log segment 302-2 comprises log entries E1, E2, E3, E4, E5, and E6, wherein in some embodiments, each log entry comprises a data item and an associated metadata item. The log entries E1, E2, E3, E4, E5, and E6 are schematically illustrated in FIG. 3 as having different sizes, which is the result of data compression in an inline compression-enabled data storage system. For purposes of illustration, the log entry E1 is shown in FIG. 3 as shaded (as compared to the other log entries E2-E6) to denote that the log entry E1 has invalidated data. In this instance, in accordance with the exemplary dynamic reserve capacity management techniques as disclosed herein, if the capacity of the invalid log entry E1 is a small percentage (via a specified threshold) of the total capacity of the log segment 302-2, the log segment 302-2 will be deemed "fully utilized" and the capacity associated with the invalid log entry E1 is deemed part of the dynamic reserve capacity.

Referring back to FIG. 2, the log-structured storage management system 250 utilizes the log-structured array metadata generation module 252 to generate log metadata which is included in metadata items that are associated data items stored in log segments of the log-structured array(s) 262. The log metadata items in the log segments comprise indexing information (e.g., pointers) that is used to provide fast random access to data items within the log segments, as well as information that describes the data items (e.g., valid, not valid, compressed, uncompressed, etc.) within the log segments, and other information such as checksums for error detection, etc. The type of information and data structures that are used to implement the log metadata will vary depending on the application.

The log-structured array directory 254 is configured to generate and maintain a directory which stores mapping information that maps logical block addresses to physical block addresses of log entries within the log-structured arrays. In some embodiments, the directory information is utilized to determine the location of a given log segment that holds the data of a given logical block address, while the metadata indexing entries within the given log segment are utilized to determine the location of corresponding data items within the log segment. For example, an entry in the log-structured array directory 254 for a given logical block address provides information such as (i) the physical ID and location of the log segment which stores the logical block, (ii) the starting location in the log segment (offset), (iii) the length in physical device units (e.g., sectors) to which the logical block address is mapped, etc. The log-structured array directory 254 can be implemented using any suitable type of directory data structure and directory implementation algorithm. For example, in some embodiments, the log-structured array directory 254 can implement a hash table which comprises key-value pairs, as is known in the art. The mapping information of the log-structured array directory 254 will vary depending on the type of storage devices 260 that are used.

The log-structured array data placement management module 256 is configured to implement data placement protocols for storing data in the log-structured arrays 262. In some embodiments, log entries that are to be written to a given log-structured array 262 are first aggregated in, e.g., a write cache, and then sequentially written to a completely free log segment. In other words, incoming I/O write data (new data and/or updated data) that is to be written to backend storage is first stored in a write buffer, and then stored in one or more free log segments such that such that the free log segments are written in full. In this regard, the log-structured storage management system 250 writes modified/updated data into free log segments at the end of the log-structured array 262 in an "out-of-place" manner, whereby the latest version of the block (which is stored in a free log segment) becomes a valid block, while the old version of the block is marked as invalidated. The out-of-place writes result in invalid blocks of data which occupy storage space that cannot be reused until reclaimed. In addition, deletion operations cause data blocks within a given log segment to become invalid.

The log-structured array defragmentation control module 258 is configured to perform garbage collection operations to defragment one or more log segments having invalid log entries, and reclaim the storage space occupied by invalid blocks to generate free log segments for use. The log-structured array defragmentation control module 258 performs defragmentation/garbage collections operations based on various policies which specify, e.g., one or more triggering events for determining when to perform a garbage collection operation, how to select one or more "victim" log segments for garbage collection, etc.

For example, in some embodiments, the garbage collection process can be implemented synchronously in response to receiving a write request when there is insufficient user capacity (or a minimum threshold amount of user capacity is reached) to process the write request. In other embodiments, the garbage collection process can be performed asynchronously, in the background, to recycle invalid capacity into free capacity during periods of idle time between the data access requests sent to the storage system. Furthermore, various techniques can be implemented to select target (e.g., victim) segments for the garbage collection/defragmentation process including, e.g., greedy techniques which are based on a number of invalid log entries within the target segments that are considered for selection as victim segments, or other techniques that take into account a combination of factors including, but not limited to, an estimated wear-level of the physical blocks associated with the log segments that are considered for selection as victim segments.

A given log segment which has entirely invalid data can be selected as a victim segment. In this instance, the log segment can be erased without having to read and write valid data blocks of the log segment to another log segment. A given log segment which has both valid and invalid data blocks can be selected as a victim segment. In this instance, the valid data blocks are copied (read and rewritten) to a free log segment, and the address mapping information is updated. Once the copying is complete, the victim segment can be erased, and the storage space of the victim segment is reclaimed and free for reuse.

The dynamic reserve capacity management system 240 is configured to manage a dynamic reserve capacity for the storage devices 260 of the given storage node 200. As noted above, the total amount of reserve capacity, at any given point in time, is based on a total amount of amount of capacity occupied by invalid data in all log segments which are deemed to have a relatively low degree of invalidation. While the capacity occupied by invalid data (referred to herein as "invalidated capacity") in a given log segment would normally be considered as free capacity which could be reclaimed for reuse, the invalidated capacity of a given log segment which has a low degree of invalidation is considered and essentially reported as "used capacity" (not free capacity) and is a form of reserve capacity because the log segments which are deemed to have a low degree of invalidation (nearly fully segments) are prevented from being selected for garbage collection. As such, the total amount of invalidated capacity of log segments, which are deemed to have a low degree of invalidation at a given point in time, constitutes the dynamic reserve capacity at the given point in time. In this regard, the dynamic reserve capacity is implemented by manipulating the actual reported available capacity to the user/host, wherein the reported available capacity excludes the invalidated capacity of each log segment which, at a given point in time, has a low degree of invalidation.

More specifically, the block utilization tracking module 242 is configured to track/monitor the utilization of log segments and determine a degree of utilization of the log segments of the log-structured array(s) 262. For a given log segment, the utilization of the log segment, (e.g., a percentage or amount of the segment which comprises invalid data or a percentage or amount of the segment which comprises valid data), is compared to a utilization threshold to determine if the given log segment should be designated and reported by the dynamic reserve capacity management system 240 as "fully utilized" (full utilization) or "partially utilized" (partial utilization). A given log segment which is designated/reported with "partially utilized" is considered as eligible for garbage collection. On the other hand, a given log segment which is designated/reported as "fully utilized" is considered as not eligible for garbage collection, even if the given log segment has some invalid data. In this instance, the garbage collection of a given log segment with a low degree of invalidation is deemed too expensive in terms of overhead for reclaiming the relatively small amount of invalidated capacity of the given log segment.

For example, in some embodiments, a percentage or amount of invalid data of a given log segment is determined and then compared to a utilization threshold. If the percentage or amount of invalid data is equal to or less than the utilization threshold, the given log segment is designated/reported as "fully utilized" and, therefore, is deemed not eligible for garbage collection, even if the given log segment has some invalid data. In this instance, the given log segment is deemed to have a low degree of invalidation. By way of example, in an exemplary non-limiting embodiment, assume that each log segment has a fixed size of 512 KB, and that the utilization threshold is set to 32 KB (or 6.25%=32 KB/512 KB). In this instance, if the amount of invalid data of a given log segment is 32 KB or less at a given time, the given log segment will be deemed "fully utilized" and not eligible for garbage collection, despite having some invalid data. On the other hand, if the amount of invalid data of the given log segment is greater than 32 KB at the given time, the given log segment will be deemed "partially utilized" and eligible for garbage collection.

With this exemplary configuration, the dynamic reserve capacity management system 240 does not pre-allocate a certain amount of the total storage capacity as reserve capacity. Rather, the dynamic reserve capacity management system 240 tracks the utilization of log segments and dynamically reserves storage capacity on a per segment basis, wherein the total amount of reserve capacity at any given point in time corresponds to the total amount of invalidated capacity of log segments which are designated as "fully utilized." In this regard, even though the invalidated capacity of log segments which are designated as "fully utilized" at a given point in time would normally be considered as "free capacity," such invalidated capacity is deemed to be "utilized capacity" and not considered as part of the "free capacity" of the log-structured storage system at the given point in time. On the other hand, the invalidated capacity of log segments which are designated as "partially utilized" at the given point in time is considered as part of the "free capacity" of the log-structured storage system. Therefore, at any given point in time, the total amount of "free capacity" of the log-structured storage system, which is reported to a user or host, does not include the dynamic reserve capacity which constitutes the total amount of invalidated capacity of log segments which are designated as "partially utilized" at the given point in time.

Over time, the amount of invalidated capacity of a given log segment, which was previously designated as "fully utilized," can increase to a level with exceeds the utilization threshold. In such case, the given log segment will have its designation changed from "fully utilized" to "partially utilized" such that the invalidated capacity of the given log segment will be deemed as "free capacity" which can be reclaimed and used by the user/host. In this instance, the invalidated capacity of the given log segment is no longer part of the dynamic reserve capacity, and the given log segment can be selected for garbage collection.

In some embodiments, the utilization threshold that is applied by the block utilization tracking module 242 to determine, e.g., the degree of invalidation of log segments, is a static parameter that is applied system wide and is not configurable by an administrator. In some embodiments, the value of the utilization threshold is determined based on a tradeoff between (i) how much user capacity is wasted by allocation of the reserve capacity and (ii) how much storage performance is reduced. As demonstrated above, the implementation of a static utilization threshold leads to a dynamic reserve capacity which varies based on workload. For example, with a utilization threshold of 6.25%, the amount of dynamic reserve capacity at any given time can theoretically be in a range of 0% of the storage system capacity to maximum overhead of 6.25% of the storage system capacity.

In some embodiments, the utilization threshold configuration module 244 is configured to allow an administrator, for example, to manually set a utilization threshold for a given storage system to optimize garbage collection and storage performance depending on the given storage configuration and application (e.g., read intensive or write intensive). Indeed, the dynamic reserve capacity for a log-structured storage system serves to minimize the cost of garbage collection and to prevent a reduction in the endurance of SSD devices due to write amplification. Some storage systems may have different storage pools, e.g., a storage pool comprising HDD devices, and a high-performance storage pool comprising SSD devices. In this instance, different utilization thresholds can be set for the different storage pools to implement different dynamic reserve capacities for the storage pools. For example, the utilization thresholds for different storage pools can be adjusted to optimize garbage collection where the costs of garbage collection are different for different storage pools with different types of storage devices.

Storage pools that require higher performance and have weaker hardware (in terms of limited endurance) can be configured with higher utilization thresholds to enable larger size dynamic reserve capacity. By way of example, for a high-performance storage pool comprising flash-based SSD devices, the cost of garbage collection is relatively high so that utilization threshold may be set to a relatively higher threshold. On the other hand, for storage pools having storage devices where the cost of garbage collection is not as expensive (e.g., in terms of increased write amplification that leads to reduced endurance as with SSD devices), the utilization threshold may be set to a relatively lower threshold. As further example, RAID groups which run on slower storage hardware can be configured with a higher utilization threshold to improve I/O performance, and RAID groups that run on storage devices with low endurance can be configured with higher utilization threshold to reduce write amplification. Moreover, over time, the performance of a storage pool may become less performance critical and more of, e.g., a legacy storage system (e.g., a read intensive workload). In such an instance, the utilization threshold can be decreased.

It is to be noted that even though any number of log segments with a small amount of invalidated capacity can be designated as "fully utilized" at a given point in time, the log-structured storage management system 250 is still aware of the amount of invalidated capacity of those log segments that are deemed "fully utilized" by the dynamic reserve capacity management system 240. Normally, the log-structured array defragmentation control module 258 will not consider log segments which are designated as "fully utilized" for garbage collection as such log segments are deemed as not eligible for garbage collection, despite having some invalidated capacity. On the other hand, there can be instances where a given log segment which is designed as "fully utilized" can become a "cold" segment having "cold data." The term "cold data" as used herein generally denotes data of a given log segment which is rarely overwritten/invalidated but can be read on a regular basis. For example, a number of log segments can hold data for, e.g., a read-only snapshot.

In this instance, cold log segments can be selected for garbage collection even if the amount of invalid data is below the utilization threshold and, thereby, reclaim the storage space occupied by the invalid data for reuse. In other words, in some embodiments, the log-structured array defragmentation control module 258 can perform a deep compression of cold segments, in which case all cold capacity is reclaimed, even below the invalidation threshold. Since the data is cold, the garbage collection essentially comprises a one-time rewrite of the valid data of the cold segments, resulting in an insignificant impact on storage I/O performance and/or endurance of the storage devices (e.g., write amplification is minimal).

Figure 4:
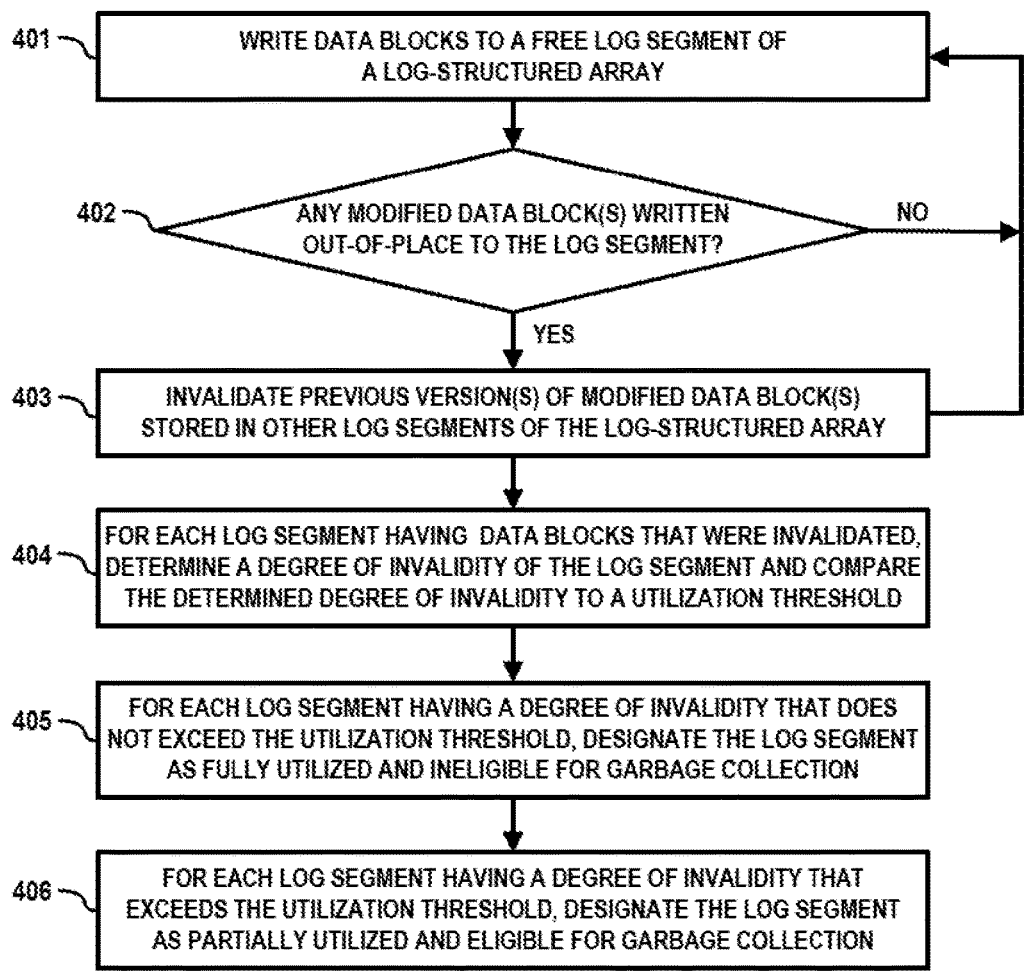
FIG. 4 illustrates a flow diagram of a method for managing a dynamic reserve capacity of a storage system, according to an exemplary embodiment of the disclosure.

FIG. 4 illustrates a flow diagram of a method 400 for managing a dynamic reserve capacity of a storage system, according to an exemplary embodiment of the disclosure. In some embodiments, the flow diagram of FIG. 4 illustrates exemplary modes of operation of the storage control system 210 of FIG. 2 and, in particular, the dynamic reserve capacity management system 240 and the log-structured storage management system 250. As noted above, in some embodiments, as the storage control system receives I/O write requests from users/hosts, the storage control system will generate and aggregate data blocks (e.g., log entries) associated with the I/O write data in a write cache, and then sequentially write the data blocks to a free log segment (block 401) such that the free log segment is written in full. In this regard, the log-structured storage management system writes modified/updated data blocks into free log segments at the end of a log-structured array in an "out-of-place" manner. If one or more modified data blocks are written "out-of-place" to the free log segment (affirmative determination in block 402), the storage control system will proceed to invalidate previous versions of the modified data blocks that are stored in other log segments of the log-structured array (block 403).

For each log segment having one or more data blocks that invalidated as a result of the out-of-place writes of the modified data blocks to the free log segment, the storage control system will determine a current degree of invalidity of the log segment and compare the determined degree of invalidity to a utilization threshold (bock 404). For each log segment having a degree of invalidity that does not exceed the utilization threshold, the storage control system will designate the log segment as "fully utilized" and ineligible for garbage collection (block 405). In this instance, the capacity that is occupied by invalid data blocks of the log segment is deemed part of the storage system reserve capacity. On the other hand, for each log segment having a degree of invalidity that does exceed the utilization threshold, the storage control system will designate the log segment as "partially utilized" and eligible for garbage collection (block 406).

With this dynamic reserve capacity management process, the total amount of dynamic reserve capacity (i.e., capacity not reported to, and not usable by, the users/hosts) will dynamically increase/decrease over time based on the given workload. FIG. 4 illustrates an exemplary process flow in which the determination of whether to include or exclude the invalidated capacity of a given log segment as part of the dynamic reserve capacity of the log-structured storage system is made when data blocks of log segments are invalidated. In the process of flow of FIG. 4, such determination is made at a time when invalidating existing data blocks in log segments, which are overwritten as a result of, e.g., out-of-place updates. In another instance, such determination is also made when invalidating existing data blocks in a log segment, when such data blocks are essentially deleted (and not just overwritten). In all instances, the process of determining the degree of utilization of a given log segment based on a utilization threshold is performed when invalidating data content of the given log segment.

It is to be appreciated that the exemplary techniques as described herein for managing a dynamic reserve capacity for a block storage system, such as a log-structured storage system, provide significant advantages over techniques that implement and manage a static, pre-allocated reserve capacity. For example, the exemplary dynamic reserve capacity management techniques do not require pre-allocation or configuration of a fixed amount of reserve storage capacity for a storage system. Instead, a dynamic reserve capacity is implemented using relatively small invalid portions of log segments and dynamically adapts (increases and decreases) to user workload. For example, the dynamic reserve capacity decreases when invalidations are concentrated, and increases when invalidation is uniform across all log segments.

Furthermore, the exemplary dynamic reserve capacity management techniques serve to limit performance reduction when a storage system is full. The use of a dynamic reserve capacity sacrifices data reduction to keep the utilization of the storage system coherent even when the reserve capacity dynamically increases. For example, the storage system will not run out of capacity at 95% because reserve was dynamically taken, and the system's capacity utilization does not change due to sudden reserve allocation.

Figure 5:
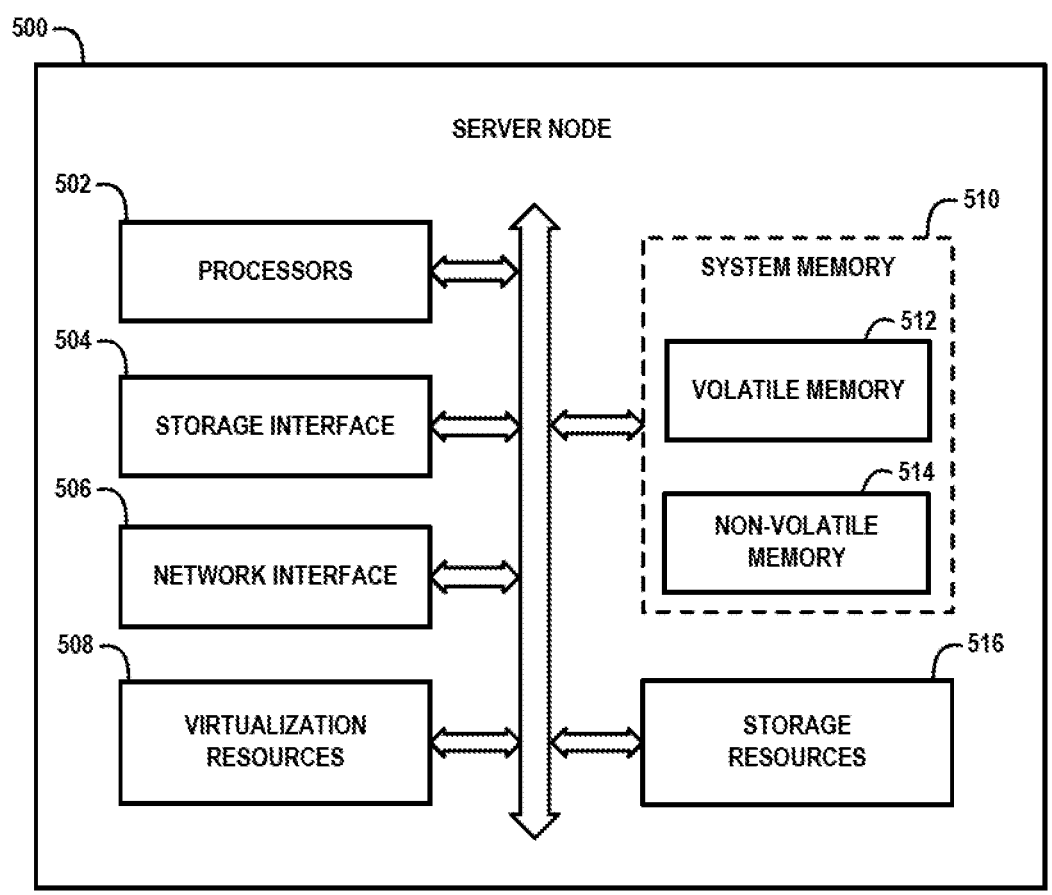
FIG. 5 schematically illustrates a framework of server node for implementing a storage system, according to an exemplary embodiment of the disclosure.

FIG. 5 schematically illustrates a framework of server node for implementing a storage system, according to an exemplary embodiment of the disclosure. In particular, FIG. 5 schematically illustrates a framework of server node for hosting software components of a software-defined storage system according to an exemplary embodiment of the disclosure. For example, FIG. 5 schematically illustrates an exemplary hardware/software configuration of, e.g., the storage nodes shown in the drawings. The server node 500 comprises processors 502, storage interface circuitry 504, network interface circuitry 506, virtualization resources 508, system memory 510, and storage resources 516. The system memory 510 comprises volatile memory 512 and non-volatile memory 514. The processors 502 comprise one or more types of hardware processors that are configured to process program instructions and data to execute a native operating system (OS) and applications that run on the server node 500.

For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more services or functions which are hosted by the server node 500. For example, the virtualization resources 508 can be configured to implement the various modules and functionalities of a host connectivity management system as discussed herein. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the compute node, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 as well execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent software components of a software-defined storage control system as described herein are implemented using program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Computer program products which comprise a non-transitory processor-readable storage medium having stored therein program code of one or more software programs are considered embodiments of the disclosure. A processor-readable storage medium may comprise, for example, a storage device such as a storage disk, a storage array or an integrated circuit containing memory. The term "processor-readable storage medium" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile memory 512 is configured as the highest-level memory tier, and the non-volatile memory 514 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the server node 500, and to temporarily store data that is utilized and/or generated by the native OS and application programs and processes running on the server node 500. The storage resources 516 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    partitioning, by a storage control system, a storage capacity of at least one storage device into a plurality of blocks for storing data;
    maintaining, by the storage control system, a portion of the storage capacity of the at least one storage device as reserve capacity;
    performing, by the storage control system, a data access operation which results in invalidating at least a portion of data stored in a given block of the plurality of blocks; and
    in response to invalidating the portion of data stored in the given block:
        determining, by the storage control system, an amount of invalidated capacity of the given block, wherein the invalidated capacity of the given block corresponds to a capacity of the given block which is occupied by invalid data;
        comparing, by the storage control system, the determined amount of invalidated capacity of the given block to a threshold;

in response to determining that the amount of invalidated capacity of the given block does not exceed the threshold:
designating, by the storage control system, a total capacity of the given block including the invalidated data of the given block, as fully utilized to prevent the invalidated capacity of the given block from being reclaimed; and
designating, by the storage control system, the invalidated capacity of the given block including the invalidated data of the given block as part of the reserve capacity of the at least one storage device;
wherein a total amount of the reserve capacity of the at least one storage device at a given time comprises a total amount of invalidated capacity of the blocks of the at least one storage device, which are designated as fully utilized at the given time.

2. The method of claim 1, further comprising marking, by the storage control system, the given block, which is designed as fully utilized, as ineligible for garbage collection.

3. The method of claim 2, further comprising:
determining, by the storage control system, whether the given block, which is marked as ineligible for garbage collection, comprises cold data; and
marking, by the storage control system, the given block as eligible for garbage collection, in response to determining that the given block comprises cold data.

4. The method of claim 1, further comprising:
in response to determining that the amount of invalidated capacity of the given block does exceed the threshold, designating, by the storage control system, the given block as partially utilized; and
in response to designating the given block as partially utilized:
reporting, by the storage control system, the invalidated capacity of the given block as user-available capacity; and
marking, by the storage control system, the given block, which is designated as partially utilized, as eligible for garbage collection.

5. The method of claim 1, further comprising setting, by the storage control system, a value of the threshold in response to a user command.

6. The method of claim 1, wherein the data access operation comprises at least one of a data delete operation and an out-of-place data write operation.

7. The method of claim 1, wherein partitioning the storage capacity of the at least one storage device into a plurality of blocks comprises partitioning the storage capacity into an array of log segments to implement a log-structured array.

8. A computer program product comprising a non-transitory processor-readable storage medium having stored therein program code of one or more software programs, wherein the program code when executed by at least one processing device causes the at least one processing device to instantiate a storage control system that is configured to:
partition a storage capacity of at least one storage device into a plurality of blocks for storing data;
maintain a portion of the storage capacity of the at least one storage device as reserve capacity;
perform a data access operation which results in invalidating at least a portion of data stored in a given block of the plurality of blocks; and
in response to invalidating the portion of data stored in the given block:
determine an amount of invalidated capacity of the given block, wherein the invalidated capacity of the given block corresponds to a capacity of the given block which is occupied by invalid data;
compare the determined amount of invalidated capacity of the given block to a threshold;
in response to determining that the amount of invalidated capacity of the given block does not exceed the threshold:
designate a total capacity of the given block including the invalidated data of the given block, as fully utilized to prevent the invalidated capacity of the given block from being reclaimed; and
designate the invalidated capacity of the given block including the invalidated data of the given block as part of the reserve capacity of the at least one storage device;
wherein a total amount of the reserve capacity of the at least one storage device at a given time comprises a total amount of invalidated capacity of the blocks of the at least one storage device, which are designated as fully utilized at the given time.

9. The computer program product of claim 8, further comprising program code which, when executed by at least one processing device, causes the at least one processing device to instantiate the storage control system that is further configured to mark the given block, which is designed as fully utilized, as ineligible for garbage collection.

10. The computer program product of claim 9, further comprising program code which, when executed by at least one processing device, causes the at least one processing device to instantiate the storage control system that is further configured to:
determine whether the given block, which is marked as ineligible for garbage collection, comprises cold data; and
mark the given block as eligible for garbage collection, in response to determining that the given block comprises cold data.

11. The computer program product of claim 8, further comprising program code which, when executed by at least one processing device, causes the at least one processing device to instantiate the storage control system that is further configured to:
in response to determining that the amount of invalidated capacity of the given block does exceed the threshold, designate the given block as partially utilized; and
in response to designating the given block as partially utilized:
report the invalidated capacity of the given block as user-available capacity; and
mark the given block, which is designated as partially utilized, as eligible for garbage collection.

12. The computer program product of claim 8, further comprising program code which, when executed by at least one processing device, causes the at least one processing device to instantiate the storage control system that is further configured to set a value of the threshold in response to a user command.

13. The computer program product of claim 8, wherein the data access operation comprises at least one of a data delete operation and an out-of-place data write operation.

14. The computer program product of claim 8, wherein the program code to partition the storage capacity of the at least one storage device into a plurality of blocks comprises program code to partition the storage capacity into an array of log segments to implement a log-structured array.

15. An apparatus, comprising:
at least one storage device; and
a storage control system that is configured to:
partition a storage capacity of the at least one storage device into a plurality of blocks for storing data;
maintain a portion of the storage capacity of the at least one storage device as reserve capacity;
perform a data access operation which results in invalidating at least a portion of data stored in a given block of the plurality of blocks; and
in response to invalidating the portion of data stored in the given block:
  determine an amount of invalidated capacity of the given block, wherein the invalidated capacity of the given block corresponds to a capacity of the given block which is occupied by invalid data;
  compare the determined amount of invalidated capacity of the given block to a threshold;
  in response to determining that the amount of invalidated capacity of the given block does not exceed the threshold:
    designate a total capacity of the given block including the invalidated data of the given block, as fully utilized to prevent the invalidated capacity of the given block from being reclaimed; and
    designate the invalidated capacity of the given block including the invalidated data of the given block as part of the reserve capacity of the at least one storage device;
  wherein a total amount of the reserve capacity of the at least one storage device at a given time comprises a total amount of invalidated capacity of the blocks of the at least one storage device, which are designated as fully utilized at the given time.

16. The apparatus of claim 15, wherein the storage control system is further configured to mark the given block, which is designed as fully utilized, as ineligible for garbage collection.

17. The apparatus of claim 16, wherein the storage control system is further configured to:
  determine whether the given block, which is marked as ineligible for garbage collection, comprises cold data; and
  mark the given block as eligible for garbage collection, in response to determining that the given block comprises cold data.

18. The apparatus of claim 15, wherein the storage control system is further configured to:
  in response to determining that the amount of invalidated capacity of the given block does exceed the threshold, designate the given block as partially utilized; and
  in response to designating the given block as partially utilized:
    report the invalidated capacity of the given block as user-available capacity; and
    mark the given block, which is designated as partially utilized, as eligible for garbage collection.

19. The apparatus of claim 15, wherein the storage control system is further configured to set a value of the threshold in response to a user command.

20. The apparatus of claim 15, wherein in partitioning the storage capacity of the at least one storage device into a plurality of blocks, the storage control system is configured to partition the storage capacity into an array of log segments to implement a log-structured array.

* * * * *